United States Patent [19]

Yasuda

[11] Patent Number: 4,784,408
[45] Date of Patent: Nov. 15, 1988

[54] DISK LABEL

[76] Inventor: James Yasuda, 729 Matsonia Dr., Foster City, Calif. 94404

[21] Appl. No.: 60,729

[22] Filed: Jun. 10, 1987

Related U.S. Application Data

[63] Continuation-in-part of Ser. No. 912,608, Sep. 29, 1986, abandoned.

[51] Int. Cl.[4] .................... B42D 15/00; B41L 1/20; G11B 3/70; B31F 5/00
[52] U.S. Cl. ........................ 283/81; 282/11.5 A; 369/273; 156/157
[58] Field of Search .............. 283/81, 74; 282/11.5 A; 369/273; 40/359, 124.4; 206/459, 425; 346/137; 156/157, 552; 359/273

[56] References Cited

U.S. PATENT DOCUMENTS

| | | | |
|---|---|---|---|
| 2,900,868 | 8/1959 | Gaffney, Jr. | 156/157 |
| 3,145,026 | 8/1964 | Shaw | 369/273 |
| 3,145,616 | 8/1964 | Schartz et al. | 369/273 |
| 3,321,208 | 5/1967 | Nicholson | 369/273 |
| 3,744,150 | 7/1973 | Folson | 369/273 |
| 3,758,355 | 9/1973 | Witherow | 156/157 |
| 4,070,223 | 1/1978 | Stalzer | 282/11.5 A |
| 4,507,883 | 4/1985 | Tarrant | 40/359 |

FOREIGN PATENT DOCUMENTS 1198858 12/1959 France ........................ 369/273

*Primary Examiner*—Frank T. Yost
*Assistant Examiner*—Paul M. Heyrana, Sr.
*Attorney, Agent, or Firm*—Flehr, Hohbach, Test, Albritton & Herbert

[57] ABSTRACT

A disk storage device (12, 14) for a data processing system (18) has a protective carrier (14) for the disk (12) configured for insertion of the diskette (12, 14) in a disk drive (16) and removal of the diskette (12, 14) from the disk drive (16). A label (10) has a sheet (19) bearing indicia (24) pertinent to the diskette (12, 14). Flexible strip fasteners (20) are connected between and attach the label (10) to the protective carrier (14). The flexible strip fasteners (20) have a sufficient length and are positioned between the protective carrier (14) and the label (10) so that the label (10) is positioned with the indicia (24) visible to a user of the data processing system (18) when the diskette (12, 14) is in the disk drive (16).

8 Claims, 1 Drawing Sheet

U.S. Patent
Nov. 15, 1988
4,784,408
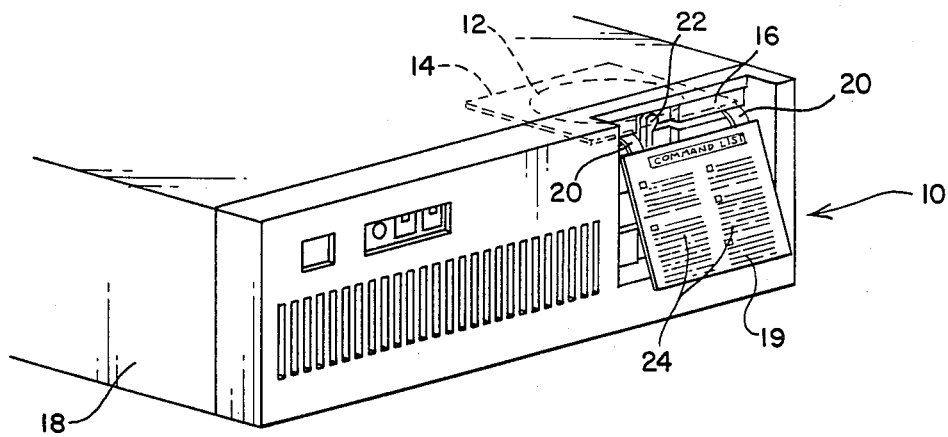
FIG. 1
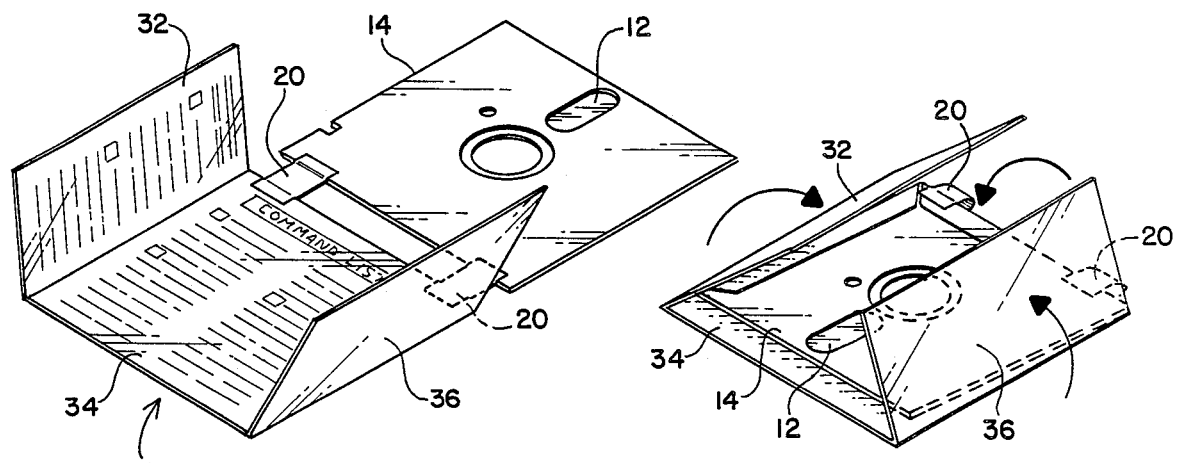
FIG. 2
FIG. 3
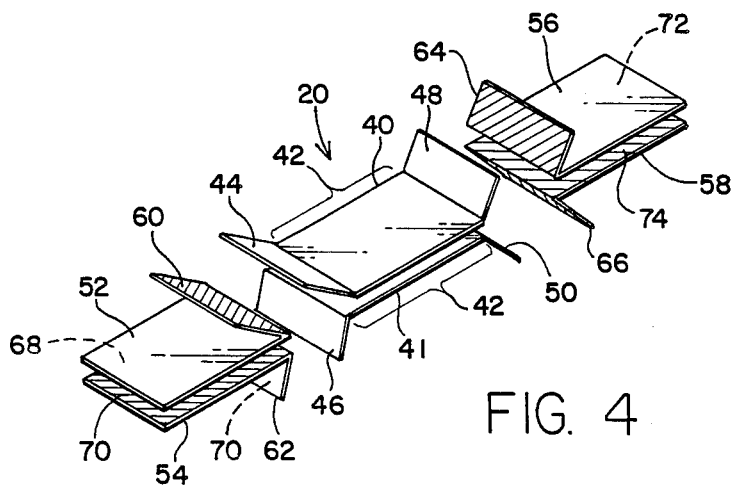
FIG. 4

DISK LABEL

ORIGIN OF THE APPLICATION

This application is a continuation-in-part of my earlier filed application Ser. No. 912,608, filed Sept. 29, 1986, now abandoned.

BACKGROUND OF THE INVENTION

1. Field of the Invention

This invention relates to an improved label for a disk storage device, such as a floppy disk or diskette, that is insertable in and removable from a data processing system disk drive. More particularly, it relates to such an improved label that is permanently associated with the diskette and is visible when the diskette is in the disk drive.

2. Description of the Prior Art

A variety of approaches have been used in the past for providing labels with information pertaining to, for example, floppy disks used to store programs and/or data used in data processing systems. Most commonly, such labels are mounted directly on the protective carrier for the floppy disk. The available space on the protective carrier is limited to areas that do not interfere with the functions of the diskette. More recently, special pens have become available which allow the information to be written directly on the protective carrier. However, when the diskette is in a disk drive, information directly on the protective carrier is not visible to the user.

Other approaches that have been used in the prior art provide the information in a form that is visible to the user, but not attached to the diskette. For example, the information can be written or printed out on the paper jacket on which the disk in the protective carrier are stored when not used. This approach requires that the same paper jacket always be kept with a particular diskette, which is inconvenient for the user. In the case of command sets for software, the information can also be provided as reference cards or keyboard overlays, but these are also inconvenient and must be located or changed whenever a different program is used.

The following issued U.S. Pat. Nos. disclose representative prior art approaches for labeling disks: U.S. Pat. No. 3,942,639, issued Mar. 9, 1976 to Cournoyer et al.; U.S. Pat. No. 4,507,883, issued Apr. 2, 1985 to Tarrant; U.S. Pat. No. 4,545,484, issued Oct. 8, 1985 to Rohner and U.S. Pat. No. 4,566,590, issued Jan. 28, 1986 to Manning et al. The Tarrant patent is the most significant of this group in that it discusses the need for making the label information visible to the user when the disk is in the disk drive, but the multiple part labeling system disclosed there suffers from the disadvantages discussed above.

To a certain extent, the problems associated with prior art disk labels can be alleviated through a help facility on the disk in the case of software, or reference to the disk directory. On-line help facilities are not always provided with software, and using the disk directory requires either exiting to DOS from a program or leaving a point in the program where the user is working, both of which interfere with use of a program. Despite the variety of disk labeling and other approaches used to provide information to the user about disks being used, a need remains for improvement in the provision of such information to the user while disks are in use.

SUMMARY OF THE INVENTION

Accordingly, it is an object of this invention to provide a disk label permanently associated with a diskette that is visible to a user when the diskette is in a disk drive of a data processing system.

It is another object of the invention to provide a novel flexible hinge strip for such a label and for similar uses.

It is a further object of the invention to provide such a disk label which also serves as a jacket for the disk and its protective carrier when the diskette is not in use.

It is still another object of the invention to provide such a disk label which is suitable for providing command and similar information to the user while using the diskette.

It is a still further object of the invention to provide such a disk label which will provide an incentive for users to obtain authorized copies of software.

The attainment of these and related objects may be achieved through use of the novel disk label and attaching strip herein disclosed. In accordance with this invention, a diskette and a protective carrier for the diskette configured for insertion of the diskette in a disk drive and removal of the diskette from the disk drive are provided. A label in the form of at least one sheet bears indicia pertinent to the disk. At least one flexible strip fastener is connected between and attaches the label to the protective carrier. The at least one flexible strip fastener has a sufficient length and is positioned with respect to the protective carrier and the label so that the label is positioned with the indicia visible to a user of the data processing system when the diskette is in the disk drive.

An attaching strip in accordance with this invention has a first strip including first and second layers bonded together along a center portion with a first and second end of the layers being free, i.e., not being bonded together. There is contact adhesive on the first and second free ends of the first and second layers. Protective strips each have a portion with a plastic surface mated to the contact adhesive on one of the first and second free, adhesive ends of the first and second layers.

In use, the user peels the protective strips off the first and second free, adhesive ends of the first and second layers and attaches the strip between a label and a protective carrier of a disk by the free, adhesive ends of the layers. While this attaching strip is particularly adapted for attaching labels to diskettes in accordance with this invention, its construction should also make it of use for attaching a wide variety of other objects, especially planar objects, together.

The attainment of the foregoing and related objects, advantages and features of the invention should be more readily apparent to those skilled in the art, after review of the following more detailed description of the invention, taken together with the drawings, in which:

BRIEF DESCRIPTION OF THE DRAWINGS

FIG. 1 is a perspective view of a disk label in accordance with the invention in use.

FIG. 2 is a perspective view of a second embodiment of a diskette and disk label in accordance with the invention.

FIG. 3 is a perspective view of the diskette and disk label of FIG. 2 in a folding position.

FIG. 4 is a partially exploded perspective view of an attaching strip in accordance with the invention.

DETAILED DESCRIPTION OF THE INVENTION

Turning now to the drawings, more particularly to FIG. 1, there is shown a disk label 10 in accordance with the invention, with a disk 12 in its protective carrier 14 inserted in disk drive 16 of computer 18. The label 10 consists of a sheet 19 attached to the protective carrier 14 for the diskette 12 by means of flexible strips 20. As shown, the flexible strips 20 are long enough so that the sheet 19 extends below the disk drive 16 when the diskette 12, 14 is fully inserted in the disk drive 16. The flexible strips 20 are also positioned between the protective carrier 14 and the sheet 19 so that they do not interfere with movement of engaging lever 22 of the disk drive 16. Such an engaging lever 22 is employed on the disk drives used, for example, with the IBM PC AT computer. Disk drives used with the IBM PC computer, for example, have a hinged door centrally located on the front of the disk drive, which is raised to its open position for insertion and removal of the diskette 12, 14 in such disk drives. With the flexible strips 20 positioned as shown in FIG. 1, they also do not interfere with operation of such a hinged door. The flexible strips 20 have the configuration described below in connection with FIG. 4. The sheet 19 has indicia 24 printed on it which represents information about the disk 12. For example, if the disk 12 contains a stored program, such as a spreadsheet, word processor, database management program or video game, the indicia 24 can represent a list of commands used when running the program. The indicia 24 could also be a directory of files on the diskette 12, 14.

In use of the diskette 12, 14, the label 10 remains attached to the diskette 12, 14 as long as the same programs or data remain stored on the diskette 12, 14. Should different programs or data be stored on the diskette 12, 14, the label 10 may be removed from the diskette 12, 14 and replaced with another label identifying the new program or data. Whenever the diskette 12, 14 is inserted in the disk drive 16, the label 10 is present in the position shown in FIG. 1, so that the indicia 24 are handy for consultation by the user. Since the label 10 remains attached to the carrier 14 during use of the diskette 12, 14, the user does not need to exercise any special effort to keep it near or associated with the diskette 12, 14. When the diskette 12, 14 is stored, the strips 20 may be folded over to place the label 10 against the protective carrier (see FIG. 3).

FIG. 2 shows another label 30 in accordance with the invention. The label 30 consists of three sheets 32, 34 and 36 of thin cardboard or stiff paper. The label 30 is attached to the protective carrier 14 of the diskette 12, 14 by means of the flexible strips 20 extending between the protective carrier 14 and the sheet 34 in the same manner as the label 10 in the FIG. 1 embodiment. When the diskette 12, 14 is not in use, the flexible strips 20 are folded over so that the carrier 14 rests on the sheet 34, as shown in FIG. 3. The sheets 32 and 36 are then folded over the protective carrier, so that the sheets 32, 34 and 36 completely enclose the protective carrier 14. With this form of the label 30, a disk jacket or envelope is not necessary, since the label 30 provides better protection for the disk 12 than the typical disk jacket or envelope. The label 30 is particularly suited for use with a disk 12 which contains a program having a large list of commands, such as a programming language, or for mass distribution of computer game disks. For a larger capacity label, even more folds than in the label 30 may be used. Another approach to a large capacity label would be a spiral type hinge fastening together a number of sheets. A transparent pocket with removable labels could be used for teaching math, science, literature or the like, with different information on the removable labels for a lesson or theme or topic. Providing a command set for a computer game in this form provides a strong incentive for users to purchase an authorized copy of the game disk, rather than obtaining a bootleg copy. Such an incentive is also a factor in the case of other software, but the problem of pirated software is particularly severe in the case of computer games. Other than as shown and described, the construction and use of the FIGS. 2 and 3 embodiment of the invention is the same as that of the FIG. 1 embodiment.

Details of the flexible strip 20 are shown in FIG. 4. The strip 20 includes two layers 40 and 41 of flexible transparent tape, such as any of its various forms that are available from 3M Corporation, St. Paul, Minn., under the trademark Scotch. The adhesive bearing surfaces of the tape layers 40 and 41 are positioned together in a center portion 42, but are separated to form free ends 44, 46, 48 and 50. In this form, the flexible strip 20 is used to fasten disk labels 10 and 30 to the protective container 14.

If desired, the flexible strip 20 can be supplied separately for users who wish to prepare their own labels 10 or 30 for attachment to their diskettes 12, 14. For this purpose, the flexible strip 20 has its ends 44, 46, 48 and 50 protected with sheets 52, 54, 56 and 58 of flexible, plastic coated paper. The sheets 52, 54, 56 and 58 have folded ends 60, 62, 64 and 66, which mate with the ends 44, 46, 48 and 50 of the flexible tape layers 40 and 41. The sheets 52, 54, 56 and 58 have a plastic coating on surfaces 68, 70, 72 and 74, so that the folded ends 60, 62, 64 and 66 can be attached to the ends 44, 46, 48 and 50 of the transparent tape, but be peeled away from the ends 44, 46, 48 and 50 to use the flexible strip 20. An example of a plastic coated paper suitable for making the sheets 52, 54, 56 and 58 is a plastic coated freezer paper available from Crown Zellerbach Corporation under the name Loczin. In use, the user removes the sheets 52, 54, 56 and 58 from each end 44–46 before attaching the ends 44–46 to a disk label and the ends 48–50 to a protective carrier 14. This is conveniently done by spreading the sheets 52 and 54 and inserting the edge of the label 30 between the ends 44 and 46 up to their intersection with center portion 42, with the label 30 and flexible hinge strip 20 on a flat surface. With the label 30 and strip 20 in the desired relative position, the protective strips 52 and 54 are then peeled off sequentially to attach the free ends 44 and 46 to the top and bottom surfaces of the label 30, as is best shown in FIG. 2. This procedure is then repeated by inserting the edge of the protective carrier 14 between the ends 48 and 50 and removing the protective strips 56 and 58 in the same manner to give the assembly shown in FIG. 2.

The labels 10 and 30 can also be supplied with the flexible strips 20 already attached to them, as an aftermarket add on to users who already have their program disks. In this case, the ends 48 and 50 have their protective sheets 56 and 58 attached, which are removed by the user to attach the ends 48 and 50 to a protective carrier 14.

The above description shows the disk labels 10 and used with a 5¼ inch diskette 12, 14. Similar labels can be provided for use with 8 inch floppies or 3½ inch diskettes. Similarly, the diskettes 12, 14 and their associated labels 10 and 30 could be used with vertically oriented disk drives as well as the horizontally oriented disk drive 16 shown. The horizontal or vertical drives can be positioned on the front of the computer 18 as shown, on its side, or in the keyboard. The labels 10 or 30 could be color coded, if desired, to assist the user in selection of diskettes. The labels 10 or 30 could be printed in Braille to allow a blind user to read the label while the diskette is in a drive. Especially durable paper or plastic could be used for labels attached to diskettes that will receive heavy usage. In addition to the forms of the labels 10 and 30, the label could be folded in its middle to give a top and bottom half which enclose the diskette in a similar manner to that of FIG. 3 when the diskette is not in use. Outside surfaces of the labels can be used to include graphics and other promotional material appropriate for a particular program.

It should now be readily apparent to those skilled in the art that a novel disk label and flexible strip capable of achieving the stated objects of the invention have been provided. The disk label of this invention remains attached to its associated diskette, but is readable by the user when the diskette is inserted in a disk drive. The label does not interfere with use of the disk drive with the diskette inserted. The user need not take any special precautions to keep the label associated with the diskette. In one form of the invention, the label serves as a protective substitute for a disk jacket or envelope. The flexible strips are especially configured for easy attachment of the label to a diskette in a manner so that the label does not interfere with opening and closing the disk drive or operation of the drive.

It should further be apparent to those skilled in the art that various changes in form and detail of the invention as shown and described may be made. It is intended that such changes be included within the spirit and scope of the claims appended hereto.

What is claimed is:

1. In combination, a disk storage device for a data processing system, a protective carrier for said disk configured for insertion of said disk in and removal of said disk from a disk drive of the data processing system, said disk being rotatable inside said protective carrier while said protective carrier is stationary in the disk drive, a label in the form of at least one sheet bearing indicia pertinent to said disk, and at least one flexible strip fastener connected between and attaching said label to said protective carrier, said at least one flexible strip fastener having a sufficient length and being positioned with respect to said protective carrier and the label so that said label is positioned outside of the disk drive with the indicia visible to a user of said data processing system when said disk is in the disk drive, and so that said flexible strip fastener and said label are free of interference with operation of the disk drive.

2. The combination of claim 1 in which said at least one flexible strip comprises a pair of parallel flexible strips spaced on either side of a centrally located portion of an edge of said label and an edge of said protective carrier.

3. The combination of claim 2 in which said pair of parallel, flexible strips each comprise a first strip including first and second layers bonded together along a center portion with first and second free ends, the first and second free ends of the first and second layers respectively being attached to said protective carrier and to said label.

4. The combination of claim 1 in which said at least one sheet comprises a first, centrally disposed sheet and second and third sheets attached to said first sheet respectively along first and second edges of said first sheet, said at least one flexible strip fastener being attached to said first sheet along a third edge of said first sheet, said first sheet being dimensioned and said at least one flexible strip fastener being positioned such that said at least one flexible strip fastener may be folded over to place said protective carrier in overlying relationship over said first sheet, and said second and third sheets being dimensioned such that they may be folded over to cover said protective carrier.

5. The combination of claim 4 in which said at least one flexible strip comprises a pair of parallel flexible strips spaced on either side of a centrally located portion of the third edge of said first sheet and an edge of said protective carrier.

6. The combination of claim 5 in which said pair of parallel, flexible strips each comprise a first strip including first and second layers bonded together along a center portion with first and second free ends, the first and second free ends of the first and second layers respectively being attached to said protective carrier and to said label.

7. The combination of claim 1 in which said flexible strip fastener comprises a first strip including first and second layers bonded together along a center portion with first and second free ends, contact adhesive on the first and second free ends of said first and second layers, protective strips each having a portion with a plastic surface attached to the contact adhesive on one of the first and second free ends.

8. The combination of claim 7 in which said first and second layers comprise transparent tape and said protective strips comprise plastic coated paper.

* * * * *